(12) United States Patent
Haikin

(10) Patent No.: US 8,218,865 B2
(45) Date of Patent: Jul. 10, 2012

(54) CONSTRUCTING A COLOR TRANSFORM USING A NEURAL NETWORK FOR COLORS OUTSIDE THE SPECTRUM LOCUS

(75) Inventor: John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1189 days.

(21) Appl. No.: 11/710,906

(22) Filed: Feb. 27, 2007

(65) Prior Publication Data

US 2008/0204832 A1    Aug. 28, 2008

(51) Int. Cl.
*G06K 9/00* (2006.01)
(52) U.S. Cl. ........................................ 382/167; 358/518
(58) Field of Classification Search .................. 382/162, 382/167; 358/518
See application file for complete search history.

(56) References Cited

U.S. PATENT DOCUMENTS

| 5,200,816 | A | * | 4/1993 | Rose | 358/518 |
| 5,285,297 | A | | 2/1994 | Rose et al. | 358/518 |
| 5,323,249 | A | * | 6/1994 | Liang | 358/518 |
| 2002/0085015 | A1 | * | 7/2002 | Wilt et al. | 345/600 |
| 2006/0152524 | A1 | * | 7/2006 | Miller et al. | 345/589 |

OTHER PUBLICATIONS

M.J. Vrhel, et al., "Color Scanner Calibration via a Neural Network", IEEE ICASSP 99, vol. 6, pp. 3465-3468, Mar. 1999.
M.J. Vrhel, "Approximation of Color Characterization MLUTs with Artificial Neural Networks", IEEE ICIP 2003, vol. 1, pp. I-465-I-468, Sep. 2003.
H. R. Kang, "Color Scanner Calibration", Journal of Imaging Science and Technology, vol. 36, No. 2, Mar./Apr. 1992, pp. 162-170.
H.R. Kang, et al., "Neural Network Applications to the Color Scanner and Printer Calibrations", Journal of Electronic Imaging, vol. 1(2), Apr. 1992, pp. 125-135.
K. Sokolowski, "Colour Scanner Calibration—A Comparison of Different Methods", Master's Thesis—Department of Numerical Analysis and Compute Science, Royal Institute of Technology, Stockholm, Sweden, Oct. 10, 2003.
M David Stone, "Color Matching", Jun. 4, 2001, 40 pages, available at <http://www.extremetech.com/article2/0,1697,15467,00.asp>.

* cited by examiner

*Primary Examiner* — Matthew C Bella
*Assistant Examiner* — Eueng-Nan Yeh
(74) *Attorney, Agent, or Firm* — Fitzpatrick, Cella, Harper & Scinto

(57) ABSTRACT

A color management module which provides color values in a destination color space by interpolation of a LUT that maps from color values in a source color space to corresponding color values in the destination color space. The LUT includes cells corresponding to color values within a spectrum locus and color values outside the spectrum locus. The LUT is populated differently for cells within the spectrum locus and for those outside the spectrum locus. For cells within the spectrum locus, color values are calculated using a color transform constructed based on device profiles for the source device and for the destination device, and corresponding cells of the LUT are populated based on the calculated values. For cells outside of the spectrum locus, an artificial neural network is trained using the calculated color values, and the corresponding cells are populated based on outputs of the trained neural network.

20 Claims, 5 Drawing Sheets

CONSTRUCTING A COLOR TRANSFORM USING A NEURAL NETWORK FOR COLORS OUTSIDE THE SPECTRUM LOCUS

BACKGROUND OF THE INVENTION

1. Field of the Invention

The present invention relates to a color management system that maps from a source color space to a destination color space using a look-up table (LUT), and more particularly the invention relates to the population of cells in the LUT using a neural network for color values outside the spectrum locus.

2. Description of the Related Art

One function of color management systems is to provide a high-fidelity color mapping of color values in a source color space to corresponding color values in a destination color space. Often, color management systems will utilize a look-up table (LUT), such as a three-dimensional LUT, generally in correspondence to the dimensionality of the source color space, with cells arranged on a regular or irregular grid. Each cell is populated with three or more color values, generally in correspondence to the dimensionality of the destination color space. Because the color values in the source color space typically do not fall precisely within any one particular cell of the LUT, interpolation such as tetrahedral interpolation is usually applied so as to obtain a color value in the destination color space that provides a high-fidelity reproduction of the corresponding color value in the source color space.

As measured relative to the full gamut of human vision, color spaces traditionally employed in the computer industry have a rather limited gamut. This is illustrated in FIG. 1, which is a diagrammatic view for explaining the size of the gamut of some color spaces. FIG. 1 shows the relationship between the gamut for sRGB color space 1 relative to the full gamut of human vision, which is known as the "spectrum locus" and is designated at 2. Diagrammatically, the spectrum locus is represented by the familiar closed-horseshoe shape of a CIEXYZ chromaticity diagram.

From FIG. 1, it can be appreciated that the sRGB color space covers only a small portion of the full gamut of human vision. Likewise, other widely used color spaces such as AdobeRGB, which is larger than sRGB, still cover only a small portion of the full gamut of human vision, as defined by the spectrum locus 2.

In an effort to overcome these difficulties, larger color spaces have been defined. As one example, scRGB is a color space that is larger than sRGB color space, in the sense that the gamut of scRGB is larger than sRGB. The sRGB color space is depicted at 3 in FIG. 1. The scRGB color space is sometimes called the "sRGB64" color space.

Because of the size of the color spaces defined by these larger color spaces, it is numerically possible to select values for each of the components that results in a color that is not within the spectrum locus. FIG. 2 illustrates this situation, and highlights problems caused by it.

FIG. 2 depicts a simplified, two-dimensional LUT 10 having plural cells such as cell 11. The cells of LUT 10 are shown as if they were arranged on a regular grid, but an irregular grid spacing is also possible. The input axes of LUT 10 (here, red and green axes) represent a color value in a source color space. The cell values of LUT 10, such as cell 11, represent the corresponding color values in the destination color space. LUT 10 thus provides a mapping from color values in a source color space to corresponding color values in a destination color space.

In use, there is an identification of cells that are adjacent to a color value in the source color space. The color values in these cells are then interpolated so as to obtain a corresponding color value in the destination color space.

In FIG. 2, dashed line 12 represents the boundaries of the spectrum locus, that is, the boundary of the full gamut of human vision. Colors to the upper right of dashed line 12 are visualizable or "see-able" colors, in the sense that they fall within the spectrum locus. Color values to the lower left of dashed line 12 fall outside the spectrum locus, and thus are not visualizable or "see-able".

Cells that fall outside the spectrum locus are marked with an "x", whereas cells within the spectrum locus are marked with an "o". For color values and LUT cells that fall completely outside the spectrum locus, such as the color values signified by reference numeral 15, there is no need to populate the adjacent cells of LUT 10. This is because such color values, while numerically possible given the large size of the color space, are not encountered in practical situations. On the other hand, for color values like that signified at reference numeral 16, the color values are completely inside the spectrum locus 12. However, because of the position of color 16 near the edge of spectrum locus 12, and the need to interpolate from "x"-marked cells adjacent color 16, there is a corresponding need to populate cells that are outside of spectrum locus 12.

SUMMARY OF THE INVENTION

The present invention addresses the foregoing by using a neural network to populate LUT cells that fall outside of the spectrum locus.

For cells that fall inside the spectrum locus, corresponding cells of the LUT are populated based on a color transform that is constructed from device profiles for the source and for the destination. For color values within the spectrum locus, use of such a color transform is sensible and yields sensible results, for the reason that the color values correspond to visualizable and "see-able" colors within the spectrum locus. Outside the spectrum locus, use of such a color transform does not yield sensible results, and indeed use of the transform might not work, or might yield absurd values. For example, use of such a color transform might yield a CIEXYZ value with negative numerical values.

Thus, according to the invention, for cells within the spectrum locus, the LUT is populated by calculating color values for the destination color space using a color transform constructed based on device profiles for the source and for the destination. Using these calculated color values, an artificial neural network is trained. Then, for cells outside the spectrum locus, cell values are populated based on the outputs of the trained neural network.

By virtue of the foregoing arrangement, cell values outside the spectrum locus are populated with sensible values, that in turn yield sensible results when used for interpolation of colors near the edge of the spectrum locus.

The invention capitalizes on the ability of an artificial network to generalize, that is, the ability of a trained neural network to provide sensible outputs even for previously-unseen inputs that were not part of the training data. In the present invention, the complexity of the neural network need not be high, and the training data need not necessarily completely cover the spectrum locus. As a result, training can be accomplished quickly, and the trained neural network can thereafter be used quickly to populate cells of the LUT that are outside the spectrum locus. This is an advantageous effect, since the LUT is ordinarily built upon an end-user's selection of a particular combination of source device and destination device.

Preferably, only cells that bound the spectrum locus are populated with the trained neural network. That is, it is ordinarily not necessary to populate all cells, such as cells that lie far outside of the spectrum locus. Thus, an artificial neural network with three inputs (corresponding to a three-dimensional scRGB source color space) and four outputs (corresponding to a CMYK destination color space), and with one hidden layer having 15 neurons, is expected to yield acceptable results.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

A color management system according to the present invention may be incorporated in an output device driver for execution in a computing device, such as a printer driver, embedded in the firmware of an output device, such as a printer, or provided in a stand-alone color management application for use on a general purpose computer. A particularly preferable arrangement is to incorporate the color management system directly into the operating system for the general purpose computer. It can be appreciated that the present invention is not limited to these embodiments and that the present invention may be used in other environments in which color management is used.

Figure 2:
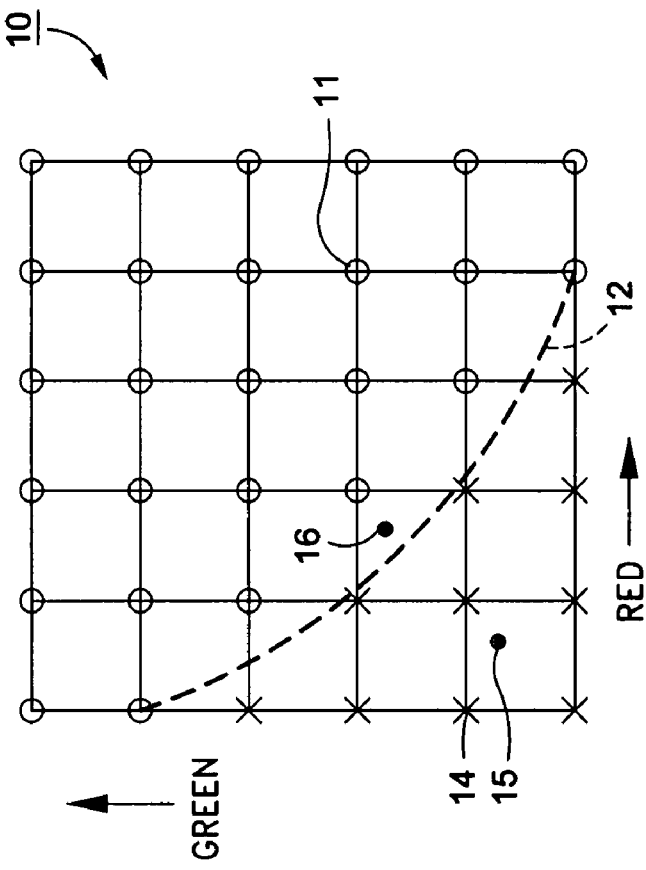
FIG. 2 depicts a simplified, two-dimensional LUT for explaining problems in conventional color management systems.
Figure 1:
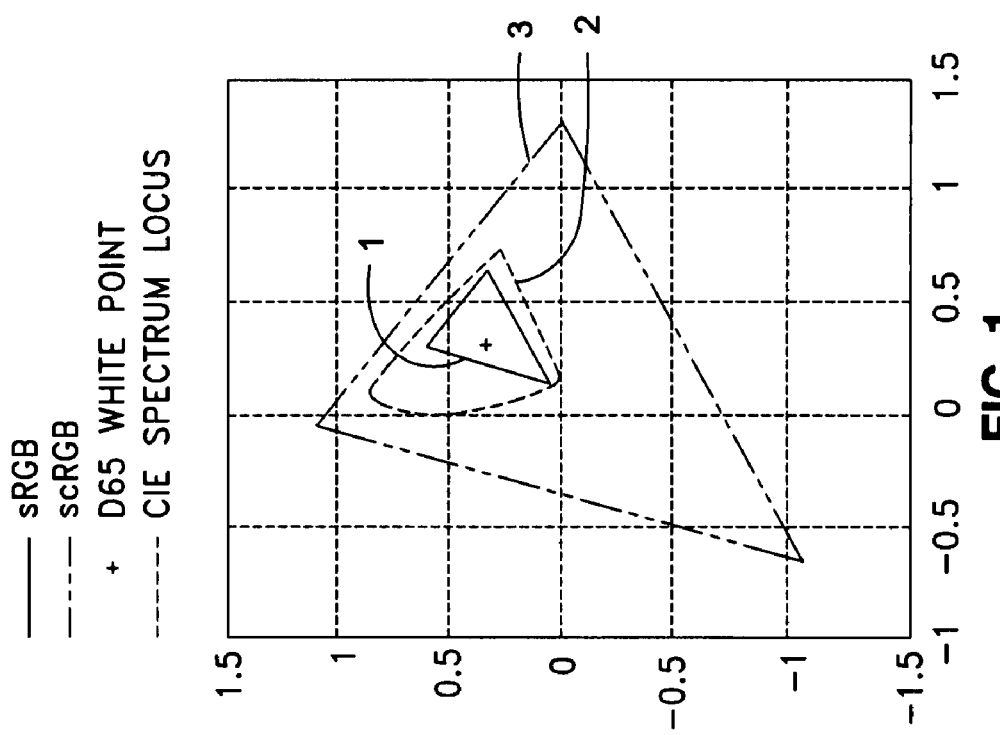
FIG. 1 is a diagrammatic view for explaining relative sizes of the gamut of various color spaces.
Figure 3:
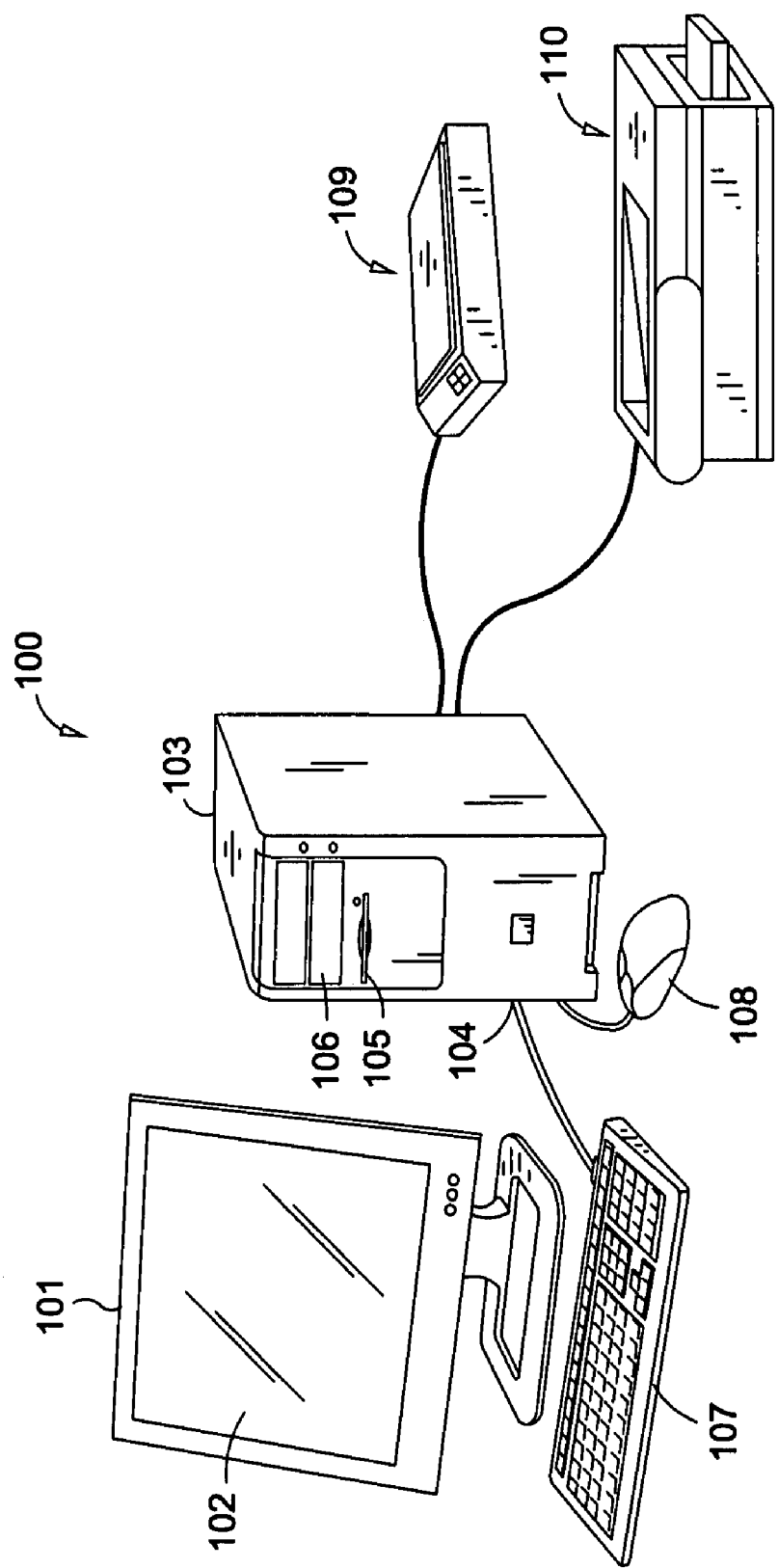
FIG. 3 is a view showing a first embodiment of the invention.

FIG. 3 shows a representative embodiment of the invention, in the form of a color-equipped workstation of an end user. FIG. 3 shows a representative view of the outward appearance of a representative computing system including computing equipment, peripherals and digital devices, all of which may be used in connection with the practice of the present invention. Computing equipment 100 includes host processor 103 which comprises a personal computer (hereinafter "PC"). Provided with computing equipment 100 are color monitor 101 including display screen 102, keyboard 107 for entering text data and user commands, and pointing device 108. Pointing device 108 preferably comprises a mouse for pointing and for manipulating objects displayed on display screen 102.

Computing equipment 100 includes a computer readable memory medium such as computer fixed disk 106 and/or CD-ROM drive 105. These drives provide a means whereby computing equipment 100 can access information, such as image color data, computer-executable process steps, application programs, device profiles, color management systems, etc. stored on removable and non-removable memory media.

Scanner 109 is an image input device which obtains color data in a source device color space. Printer 110 is an output device which forms color images on a recording medium in a destination device color space.

Scanner 109 is one example of an image input device which obtains color data in a source device color space. Other examples include, without limitation, a digital camera and image-processed computer-generated files. Preferably, the source device color space is a color space larger than an sRGB color space, such as scRGB or the like.

Likewise, printer 110 is one example of an output device for which color values are obtained in a destination device color space. Other examples include, without limitation, monitor 101 and a lithograph press.

Color characteristics of both the source device and the destination device are characterized by device models such as a device profile. Typically, a device profile would include any of a transform-based profile, a measurement-based profile, or a spectrally-based profile.

Figure 4:
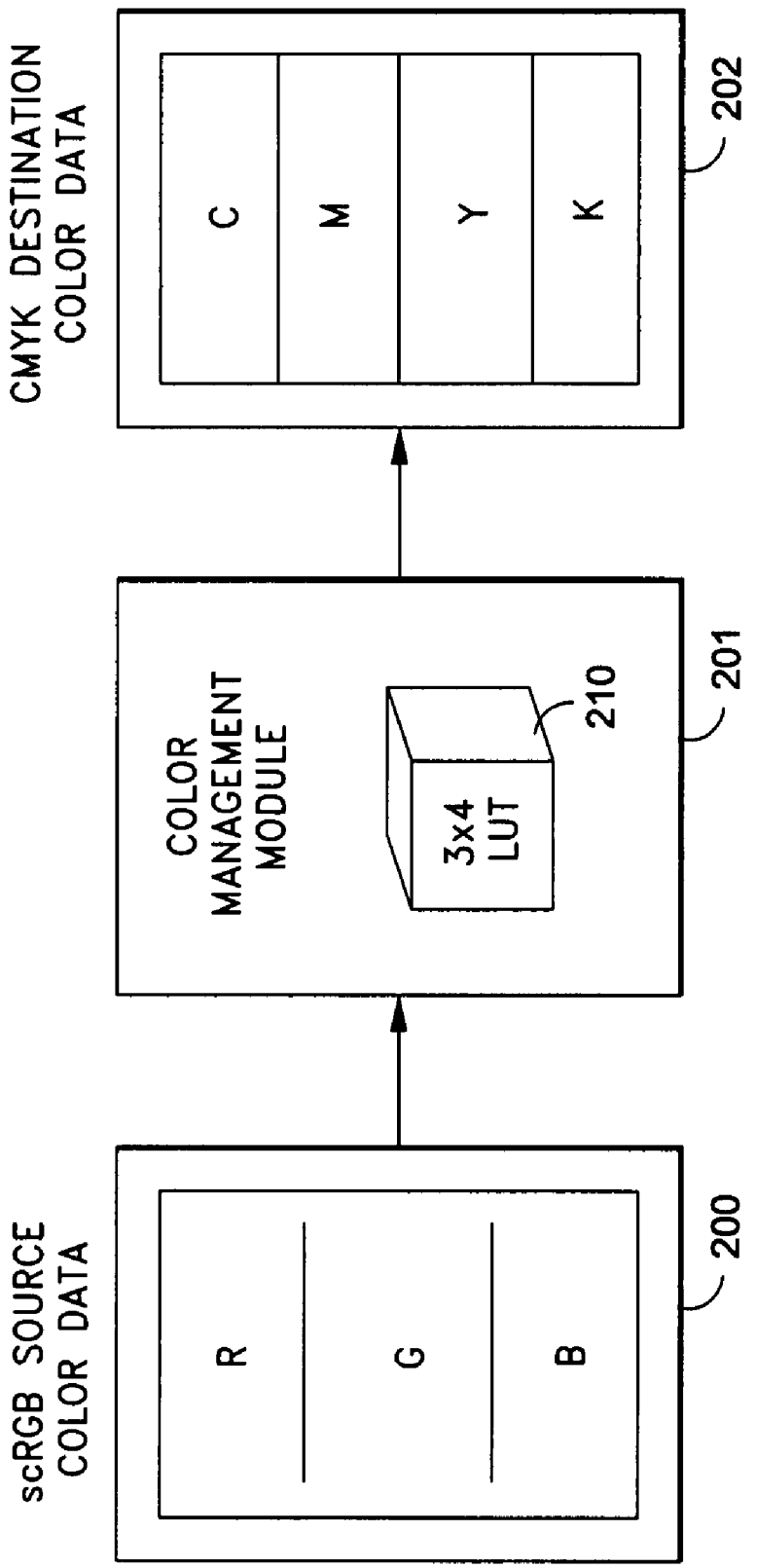
FIG. 4 is a view showing a color management module according to the invention.

FIG. 4 is a depiction for providing a general explanation of a color management system according to the present invention. The color management system is implemented in a color management module (CMM) 201. In this embodiment, CMM 201 is supplied with scRGB source color data 200 from scanner 109 in order to generate CMYK destination color data 202 for printer 110.

In the FIG. 4 depiction, CMM 201 maps color values in the source scRGB color space to corresponding color values in the CMYK destination color space. The mapping is performed by interpolation of values stored in cells of a three-dimensional color look-up table (LUT) 210. Each cell corresponds to the coordinates of an scRGB input color value. Each cell stores four values corresponding to CMYK output color values. Interpolation is performed on values found in cells adjacent to the input scRGB color value.

A method according to the invention for populating cells in the 3×4 LUT 210 will now be described.

Figure 5:
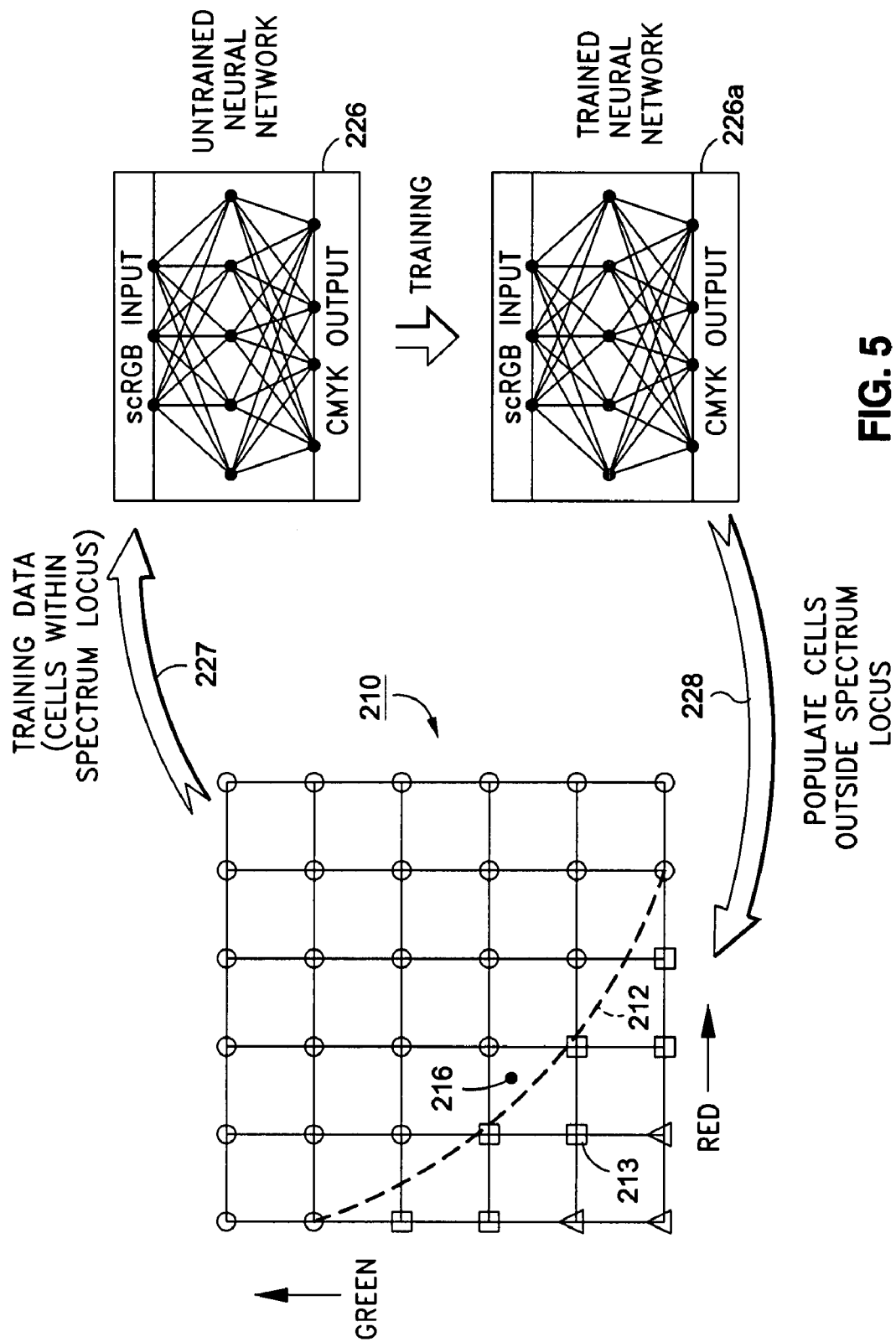
FIG. 5 is a functional diagram showing population of a LUT using a neural network according to the invention.

FIG. 5 is a functional view for explaining the population of cells in the 3×4 LUT 210. For purposes of simplifying the explanation, but without loss of generality, the LUT in FIG. 5 is depicted as a two-dimensional LUT, rather than the 3-dimensional LUT according to the actual embodiment. In addition, the LUT of FIG. 5 is shown with cells arranged in a regular grid, with uniform spacing, but the invention may also be implemented in connection with a LUT having a non-regular and non-uniform grid structure.

In a first step, cells in the LUT that fall within the spectrum locus 212 are populated. In FIG. 5, cells within the spectrum locus 212 are marked with an "o". For these cells, color values are calculated in the destination color space using a color transform constructed based on the device model for the source device and the destination device. This is explained in FIG. 6.

Figure 6:
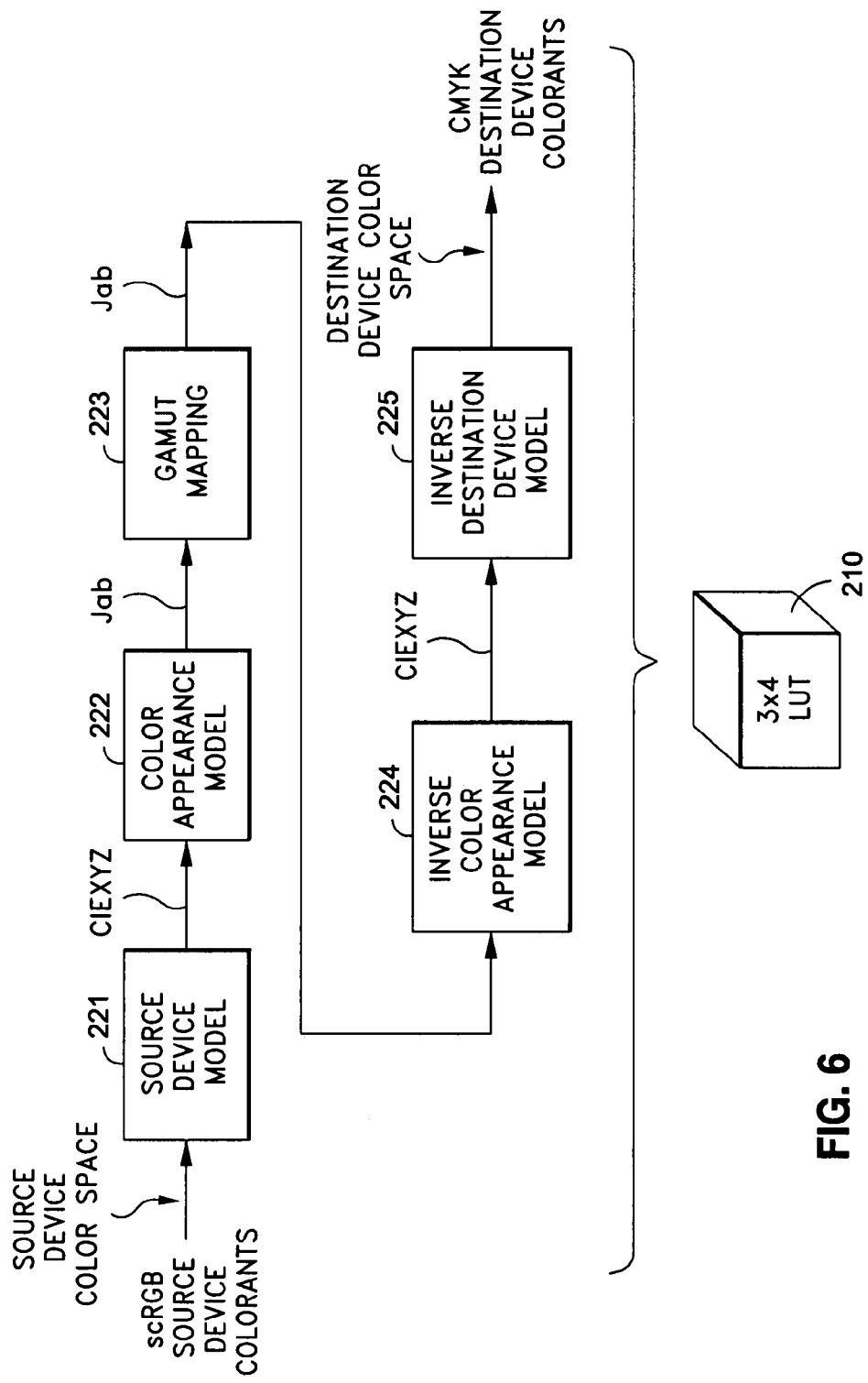
FIG. 6 is a functional view showing the calculation of color values based on device profiles for source and destination devices.

FIG. 6 depicts the flow of data from scRGB source device colorant values in the source device color space, to destination device colorant values for the CMYK destination color space. This transformation sequence is applied to scRGB color values that fall within the spectrum locus 212. The transformation is defined based on the end user's selection of a combination of the source device and destination device. In addition, the end user may specify lighting conditions or other factors that affect color appearance. Once these parameters have been selected, CMM 201 constructs a source device model 221 and a destination device model. The destination device model is inverted as shown at 225. In addition, CMM 201 constructs a color appearance model 222 for mapping between a device-independent space (such as CIEXYZ) and a color appearance space (such as Jab), for both of the source device and the destination device. An inverse color appearance model is used for the destination, as shown as 224. Finally, CMM 201 constructs a gamut mapping 223, so as to accommodate differences between gamuts of the source device and the destination device.

Once the foregoing have been assembled, CMM 201 constructs the color transform as shown by the sequence illustrated in FIG. 6. Thus, for each cell within the spectrum locus, an scRGB color value in source device color space is transformed via source device model 221 into device-independent color space CIEXYZ. The color appearance model 222 is applied, so as to transform the device-independent color space into a color appearance color space, which in this embodiment is a Jab color space. Gamut mapping 223 is applied, which results in gamut-mapped color values in Jab color space. An inverse color appearance model 224 is applied, so as to convert to device-independent color space such as CIEXYZ. Finally, inverse destination device model 225 is applied, so as to obtain CMYK color values in the destination device color space. The CMYK color value is used to populate the corresponding cell in LUT 210.

It will be understood that the color transform shown in FIG. 6 is representative only. It is possible to omit some of the transformation steps. For example, gamut mapping can be performed in device-independent space, or gamut mapping might be omitted. In addition, it is possible to include additional color transformation color sequences. It is also possible for CMM 201 to combine some or all of the individual transformations shown in FIG. 6, into one or a few composite transformations.

Reverting to FIG. 5, it will be understood that for cells marked with a "o", which are within the spectrum locus 212, color values have been calculated for the destination color space using the color transform of FIG. 6. The color transform has been constructed based on device profiles for the source and for the destination, and the calculated color values have been used to populate corresponding cells "o" in LUT 210. Using these calculated color values, an artificial neural network 226 is trained, as signified by arrow 227. The precise nature of the neural network is unimportant, so long as the neural network generalizes well on color values that differ from the training set. In the present embodiment, the neural network is a feed-forward neural network with three layers: an input layer, a hidden layer, and an output layer. The input layer has three neurons corresponding to the individual r, g and b color values for the scRGB input. The output layer has four neurons corresponding to the four individual C, M, Y and K values of the CMYK output color space. The hidden layer has 12 neurons. Each layer is fully connected to a preceding layer. Training is preferably supervised training (as opposed to unsupervised training), and can be performed by back propagation or any other gradient-based training.

Preferably, all of the cells and cell values within spectrum locus 212 are used to train neural network 226. However, this is not strictly required, and it is possible to train the neural network on less than all of the cells and cell values. For example, it is possible to train the neural network using nearly all of the cells near to the edge of the spectrum locus 212, and only a few of the cells at the far interior of the spectrum locus. Such training emphasizes edge effects, and since fewer than all of the cells are used for training, training progresses more rapidly.

After training, the trained neural network is used to populate cells that fall outside spectrum locus 212, as signified at arrow 228. Cells outside spectrum locus 212 are designated with an open square ("☐") such as cell 213 and with an open triangle ("△"). For each such cell, the scRGB color values corresponding to the indices of the LUT are input to the trained neural network 226a, and the CMYK output therefrom is populated into the cell.

Preferably, not all cells outside the spectrum locus are populated. In particular, since the primary purpose of populating cells outside of spectrum locus 212 is to permit interpolation for colors like color 216 near the edge of the spectrum locus, it is permissible to populate only those cells that are adjacent the boundary of spectrum locus 212. These cells are designated with an open square ("☐") and exclude those cells designated with an open triangle ("△").

After the needed cells of LUT 210 have been populated, CMM 201 uses the LUT in the manner described above in connection with FIG. 4, so as to transform scRGB color values for actual image data into corresponding CMYK color values.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of populating cells in a look-up table (LUT) which maps from input color values in a source color space to corresponding output color values in a destination color space, wherein the LUT includes cells corresponding to first input color values within a spectrum locus and second input color values outside the spectrum locus, wherein the method comprises:

using a computer to determine whether cells in the LUT correspond to the first input color values within the spectrum locus or to the second input color values outside the spectrum locus;

for cells determined to correspond to the first input color values, all of which are within the spectrum locus, calculating first output color values in the destination color space using a color transform, wherein the color transform is constructed based on device profiles for the source and for the destination which are defined based on user's selection, and populating corresponding cells of the LUT based on the calculated first output color values;

training an artificial neural network using the calculated first output color values; and for cells determined to correspond to the second input color values outside the spectrum locus, calculating second output color values in the destination color space using outputs of the trained neural network, and populating corresponding cells based on the calculated second output color values;

wherein the neural network is a feed-forward neural network with at least three layers including an input layer, at least one hidden layer having 12 or more neurons, and an output layer;

wherein the neural network is trained on fewer than all cells within the spectrum locus; and wherein the neural network is trained primarily on cells near an edge of the spectrum locus, and fewer than all cells at an interior of the spectrum locus.

2. A method according to claim 1, wherein said one hidden layer has 15 or more neurons.

3. A method according to claim 1, wherein the device profiles for the source and for the destination, upon which the color transform is constructed, are defined based on user selection.

4. A method according to claim 1, wherein the spectrum locus corresponds to a gamut of human vision and is defined by a closed horseshoe-shaped region in CIE color coordinates.

5. A method of populating cells in a look-up table (LUT) which maps from input color values in a source color space to corresponding output color values in a destination color space, wherein the LUT includes cells corresponding to first input color values within a spectrum locus and second input color values outside the spectrum locus, wherein the method comprises:
- using a computer to determine whether cells in the LUT correspond to the first input color values within the spectrum locus or to the second input color values outside the spectrum locus;
- for cells determined to correspond to the first input color values, all of which are within the spectrum locus, calculating first output color values in the destination color space using a color transform, wherein the color transform is constructed based on device profiles for the source and for the destination, and populating corresponding cells of the LUT based on the calculated first output color values;
- training an artificial neural network using the calculated first output color values; and
- for cells determined to correspond to the second input color values outside the spectrum locus, calculating second output color values in the destination color space using outputs of the trained neural network, and populating corresponding cells based on the calculated second output color values.

6. A method according to claim 5, wherein the neural network is a feed-forward neural network with at least three layers including an input layer, at least one hidden layer, and an output layer.

7. A method according to claim 5, wherein the neural network is trained by supervised training.

8. A method according to claim 7, wherein the neural network is trained by a back propagation gradient technique.

9. A method according to claim 5, wherein the neural network is trained on color values from all cells within the spectrum locus.

10. A method according to claim 5, wherein the neural network is trained on less than all cells within the spectrum locus.

11. A method according to claim 10, wherein the neural network is trained primarily on cells near an edge of the spectrum locus, and fewer than all cells at an interior of the spectrum locus.

12. A method according to claim 5, wherein all cells outside the spectrum locus are populated.

13. A method according to claim 5, wherein less than all cells outside the spectrum locus are populated.

14. A method according to claim 13, wherein cells outside the spectrum locus that bound the spectrum locus are populated.

15. A method according to claim 5, wherein the source color space is an expanded-gamut color space.

16. A method according to claim 15, wherein the source color space essentially consists of scRGB.

17. A method according to claim 5, wherein the device profiles for the source and for the destination, upon which the color transform is constructed, are defined based on user selection.

18. A method according to claim 5, wherein the spectrum locus corresponds to a gamut of human vision and is defined by a closed horseshoe-shaped region in CIE color coordinates.

19. A color management module for converting an input color value in a source device color space to a corresponding output color value in a destination device color space, comprising:
- an input unit constructed to receive a designation of the source device and a designation of the destination device;
- a construction unit which constructs a color look-up table (LUT) which maps from input color values in the source device color space to corresponding output color values in the destination device color space; and
- an interpolation unit constructed to interpolate color values stored in the cells of the LUT that are adjacent an input color value in the source device color space, so as to provide the corresponding output color value in the destination device color space;
- wherein the LUT includes cells corresponding to first input color values within a spectrum locus and second input color values outside the spectrum locus, and
- wherein the color management module includes computer-executable program code retrievably stored on a non-transitory computer-readable memory medium to populate cells in the LUT, wherein the program code controls the computer to perform a method according to any of claims 5 to 16 and claims 1 to 4.

20. A non-transitory computer-readable storage medium which retrievably stores computer-executable process steps, the computer-executable process steps for populating cells in a look-up table (LUT) which maps from input color values in a source color space to corresponding output color values in a destination color space, wherein the LUT includes cells corresponding to first input color values within a spectrum locus and second input color values outside the spectrum locus, said computer-executable process steps comprising process steps executable to perform a method according to any of claims 5 to 16 and claims 1 to 4.

* * * * *